United States Patent
Peng et al.

(10) Patent No.: US 11,403,078 B2
(45) Date of Patent: Aug. 2, 2022

(54) INTERFACE LAYOUT INTERFERENCE DETECTION

(71) Applicant: VMware, Inc., Palo Alto, CA (US)

(72) Inventors: Rongbo Peng, Beijing (CN); Demin Yan, Campbell, CA (US)

(73) Assignee: VMWARE, INC., Palo Alto, CA (US)

( * ) Notice: Subject to any disclaimer, the term of this patent is extended or adjusted under 35 U.S.C. 154(b) by 703 days.

(21) Appl. No.: 15/331,169

(22) Filed: Oct. 21, 2016

(65) Prior Publication Data
US 2018/0113858 A1   Apr. 26, 2018

(51) Int. Cl.
*G06F 8/38*       (2018.01)
*G06F 9/451*      (2018.01)
*G06F 40/58*      (2020.01)
*G06F 40/106*     (2020.01)
*G06F 40/143*     (2020.01)
*G06V 30/10*      (2022.01)
*G06V 30/413*     (2022.01)

(52) U.S. Cl.
CPC ............... *G06F 8/38* (2013.01); *G06F 9/454* (2018.02); *G06F 40/106* (2020.01); *G06F 40/143* (2020.01); *G06F 40/58* (2020.01); *G06V 30/10* (2022.01); *G06V 30/413* (2022.01)

(58) Field of Classification Search
CPC .................................................. G06F 17/289
USPC ....................................................... 715/703
See application file for complete search history.

(56) References Cited

U.S. PATENT DOCUMENTS

| | | | | |
|---|---|---|---|---|
| 5,587,902 A * | 12/1996 | Kugimiya | ............. | G06F 17/218 704/2 |
| 6,507,812 B1 * | 1/2003 | Meade | ............. | G06F 9/454 704/8 |
| 7,581,208 B2 * | 8/2009 | Aoyama | ............. | G06F 9/454 717/124 |
| 7,752,501 B2 * | 7/2010 | Bak | ............. | G06F 11/3688 714/38.14 |
| 9,262,407 B1 * | 2/2016 | Ermann | ............. | G06F 17/28 |
| 9,367,938 B2 * | 6/2016 | Brenzel | ............. | G06T 11/60 |
| 2004/0167784 A1 * | 8/2004 | Travieso | ............. | G06F 40/58 704/270.1 |
| 2004/0205671 A1 * | 10/2004 | Sukehiro | ............. | G06F 17/2735 715/259 |

(Continued)

*Primary Examiner* — Sherief Badawi
*Assistant Examiner* — Conrad R Pack
(74) *Attorney, Agent, or Firm* — Thomas | Horstemeyer, LLP

(57) ABSTRACT

The layout of network-based interfaces can be defined in markup language files rendered in browsers executed on client devices. Interference problems among interface elements in such interfaces can be detected using the tools and processes described herein. The text nodes in a markup language file can be parsed out for processing. A number of pseudo characters or strings can be inserted into the text nodes to mimic the expansion that might occur if the plaintext in the text nodes was translated into a different language. The positions of those text nodes can then be determined and evaluated for interference with each other. Additionally or alternatively, the text nodes can be machine translated to a different language. In turn, the markup file including the translated text nodes can be rendered to evaluate whether the translated text nodes interfere with each other using optical character recognition, for example.

20 Claims, 5 Drawing Sheets

(56) References Cited

U.S. PATENT DOCUMENTS

| | | | |
|---|---|---|---|
| 2008/0139191 A1* | 6/2008 | Melnyk | H04L 67/2823 |
| | | | 455/419 |
| 2010/0262904 A1* | 10/2010 | Chou | G06F 16/9577 |
| | | | 715/240 |
| 2013/0173247 A1* | 7/2013 | Hodson | G06F 40/45 |
| | | | 704/4 |
| 2014/0095143 A1* | 4/2014 | Jan | G06F 40/163 |
| | | | 704/2 |
| 2014/0247965 A1* | 9/2014 | Van Wesep | G09B 7/06 |
| | | | 382/103 |
| 2015/0154164 A1* | 6/2015 | Goldstein | G06F 16/9577 |
| | | | 715/229 |
| 2015/0286742 A1* | 10/2015 | Zhang | G06Q 30/02 |
| | | | 715/252 |
| 2016/0170963 A1* | 6/2016 | Bartley | G06F 17/212 |
| | | | 715/760 |

* cited by examiner

INTERFACE LAYOUT INTERFERENCE DETECTION

BACKGROUND

Content is often served over the internet to browsers executing on client devices using the Hypertext Transfer Protocol (HTTP) and/or other internet- or network-based protocols. Beyond content, the features of various applications are also available through browsers executing on client devices using internet- or network-based protocols. In either case, the content and/or applications can be presented in the form of one or more in-browser display pages. Such in-browser display pages can include user interfaces each having a particular (UI) layout.

The layouts of UIs are often designed to account for a number of factors, such as the features of and uses for an application, the sizes of interface elements, and the placement (e.g., layout) of interface elements so that they are easy to identify, access, understand, and use. Among others, interface elements can include input elements, navigation elements, and informational elements. Examples of input elements include buttons, text fields, checkboxes, radio buttons, dropdown lists, list boxes, toggles, and other input elements. Examples of navigation elements include sliders, search fields, tags, icons, and other navigation elements. Examples of informational elements include tooltips, icons, progress bars, notifications, message boxes, modal windows, and other informational elements.

Network-based in-browser display pages with UIs can include a number of content and interface elements and accept input from users. The content and layout of such pages (and the interfaces in such pages) can be defined through a combination of plaintext, markup, script, stylesheet, and other human and machine-readable languages and frameworks in one or more markup language files. Further, certain aspects of the interfaces can be updated asynchronously (e.g., without a browser refresh) in some cases using either or both client-side and server-side scripts.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
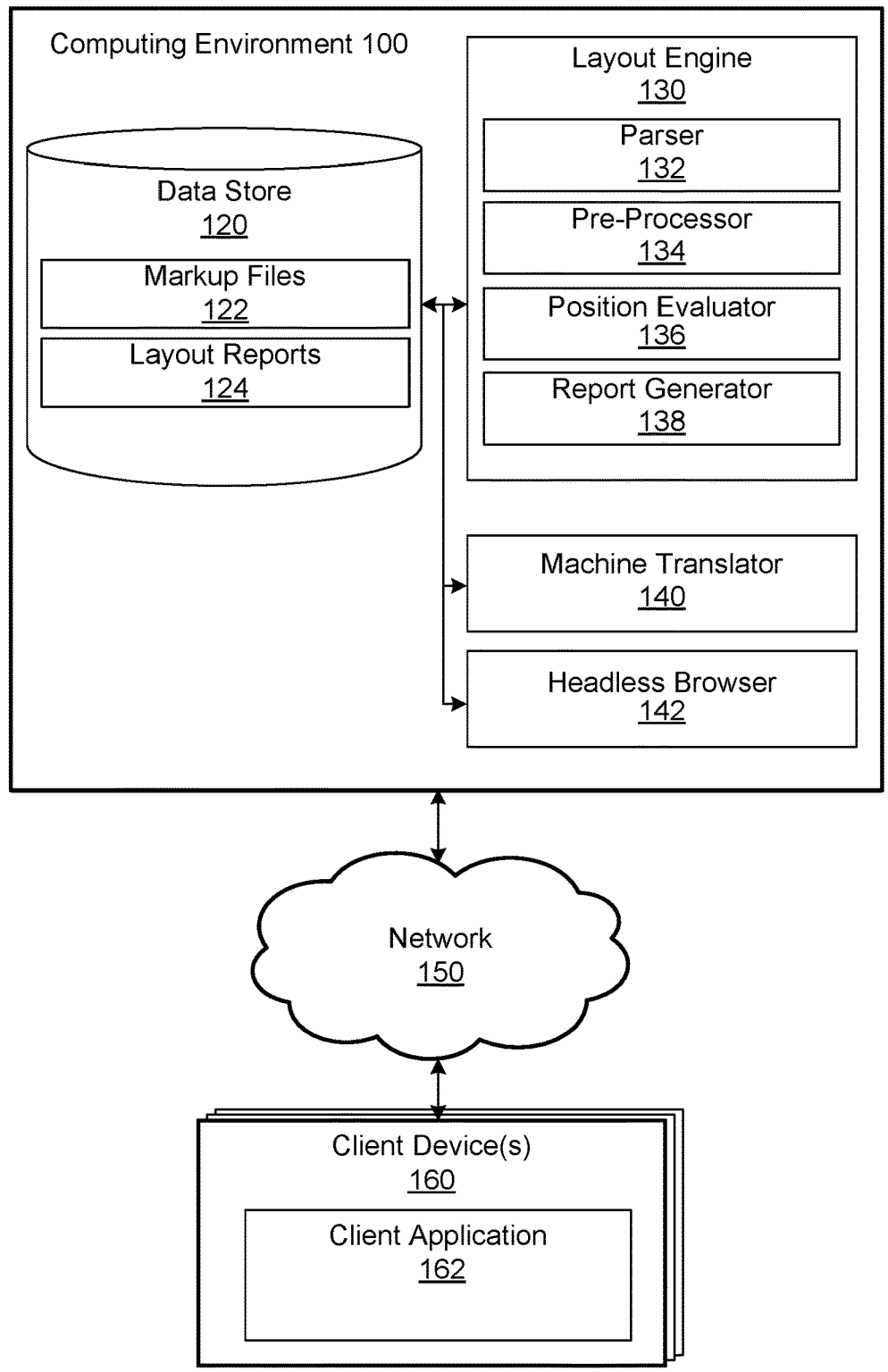
FIG. 1 illustrates an example networked environment for interface layout interference detection according to various examples described herein.

As noted above, network-based interfaces can include a number of content and interface elements and accept input from users by rendering pages for display in a browser executing on a client device. The content and layout of such interfaces can be defined in one or more markup language files. Extensible markup language (XML), hypertext markup language (HTML), and extensible hypertext markup language (XHTML) files are all examples of markup language files that can be used to render an interface in a browser executing on a client device.

Markup language files can include a combination of plaintext, markup, script, stylesheet, and other human and machine-readable languages and frameworks in one or more files. Among others, markup files can include or use cascading style sheet (CSS), hypertext preprocessor (PHP), Java™, JavaScript, asynchronous JavaScript and XML (AJAX), Apache Flex™, or other stylesheets, scripts, frameworks, or languages. When rendered, markup language files can provide a combination of static and dynamic interface elements with client-side or server-side interface updates and controls. Markup files can be organized as a document object model (DOM), which offers a cross-platform and language-independent interface to the markup language file based on a tree structure.

The development of the layout for interfaces rendered from markup language files can be relatively time consuming, especially when accounting for usability factors. The development can be further complicated if the application will be distributed over computer networks to various users in countries with different native languages. In that case, the markup files can be updated to include different plaintext for each of the different native languages. However, the size, including the length and height, of a plaintext string in one language often varies as compared to that in other languages. Thus, the spacing requirements for the layout of interface elements can vary based on the height and length of plaintext stings, among other factors, associated with the interface elements in different markup files for different languages.

In the context of the problem outlined above, tools for the detection of layout interference problems in user interfaces rendered from markup language files are described. The concepts are not limited to the detection of layout interference problems in markup language files, however, and can be applied to the detection of layout problems in other fields UI development and presentation. Overall, because the translation of plaintext characters and strings into different languages can lead to unintended layout problems, text nodes in markup language files can be parsed out for processing. In one case, a number of pseudo characters or strings can be inserted into the text nodes to mimic the expansion that might occur if the plaintext in the text nodes was translated into a different language. The positions of those text nodes can then be determined and evaluated for interference with each other. Additionally or alternatively, the content in the text nodes can be machine translated into one or more different languages. In turn, the markup file including the translated text nodes can be rendered to evaluate whether any user interface elements associated with the translated text nodes interfere with each other (e.g., are obscured in part or whole) using optical character recognition techniques, for example. The use of machine translated text nodes can lead to relatively accurate layout interference detection because the translated text nodes are often very similar to (if not the same as) the height and length of the text nodes once adapted to different languages. A report can also be generated that details any layout issues identified.

Turning to the drawings, the following paragraphs provide an outline of a networked environment followed by a discussion of the operation of the same. FIG. 1 illustrates an example networked environment 10 for interface layout interference detection according to various examples described herein. The networked environment 10 includes a computing environment 100, a network 150, and a client device 160.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographical locations. The computing environment 100 can include a plurality of computing devices that together embody a hosted computing resource, a grid computing resource, or other distributed computing arrangement. In some cases, the computing environment 100 can be embodied as an elastic computing resource where an allotted capacity of processing, network, storage, or other computing-related resources varies over time. As further described below, the computing environment 100 can also be embodied, in part, as certain functional or logical (e.g., computer-readable instruction) elements or modules. Those elements can be executed to direct the computing environment 100 to perform aspects of interface layout interference detection described herein.

As shown in FIG. 1, the computing environment 100 includes a data store 120. The data store 120 includes memory areas to store markup files 122 and layout reports 124, among other types of data files. The computing environment 100 also includes a layout engine 130, a machine translator 140, and a headless browser 142 among other components. The layout engine 130, machine translator 140, and headless browser 142 can interface (e.g., communicate) with each other using application program interface (API) calls or other suitable interface(s). In some cases, the machine translator 140 and/or headless browser 142 can execute on a computing device or environment separate from the computing environment 100, and the layout engine 130 can access one or both of them through the network 150. The operation of the computing environment 100, including the layout engine 130, machine translator 140, and headless browser 142, is described in greater detail below.

The network 150 can include the Internet, intranets, extranets, wide area networks (WANs), local area networks (LANs), wired networks, wireless networks, cable networks, satellite networks, other suitable networks, or any combinations thereof. As one example, the computing environment 100 and the client device 160 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the computing environment 100 and the client device 160 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client device 160 is representative of one or a plurality of client devices. The client device 160 can be any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

As illustrated in FIG. 1, the client device 160 can execute various applications, such as the client application 162, which is representative of one application that can be executed on the client device 160. The client application 162 can be a hypertext-based network browser, such as the Internet Explorer®, Firefox®, Chrome®, Safari®, or Silk® browsers, among other types of browsers. Alternatively, the client application 162 can be embodied as a dedicated application or console, such as an e-mail client, messaging client, or other application for another purpose. In any case, when executed in the client device 160, the client application 162 can interpret and render various interfaces on a display of the client device 160 based on markup language (and other) files received by the client device 160 from the computing environment 100 over the network 150.

Turning back to the computing environment 100, the data store 120 includes memory areas to store the markup files 122 and the layout reports 124. The data store 120 can be used to store other types of files, including standalone script, content, executable code, and other files being processed by the layout engine 130, the machine translator 140, and the headless browser 142. The markup files 122 include any type of markup files, such as XML, HTML, XHTML, or other markup files. The markup files 122 can be communicated over the network 150 to the client device 160 to be interpreted and rendered by the client application 162. The markup files 122 can include or use CSS, PHP, Java™, JavaScript, AJAX, Apache Flex™, or other stylesheets, scripts, frameworks, or languages to define the layout of interface elements. When interpreted and rendered by the client application 162, the markup files 122 can provide a combination of static and dynamic interface elements, potentially using client-side or server-side interface updates and controls, for display. The markup files 122 can be organized as a document object model (DOM), which offers a cross-platform and language-independent interface to the markup language file based on a tree structure.

As described in further detail below, the layout reports 124 include reports that detail the interface layout problems detected by the layout engine 130. The layout reports 124 can be used by developers to identify and correct problems that might arise when the markup language files 122 are adapted for use with different languages. The layout reports 124 can be prepared and stored in any suitable format for presentation to developers.

The development of the markup files 122, including the layouts of interfaces defined in the markup files 122, can be time consuming. The development can be complicated particularly if the applications or features enabled through the markup files 122 will be distributed over computer networks to countries with different native languages. In that case, a number of the markup files 122 may need to be modified to include characters and strings for each of the different native languages. However, the height and length of a character string in one language often varies as compared to that in other languages. Thus, the spacing requirements for the interface elements defined in the markup files 122 can vary depending upon which language the markup files 122 are tailored for. In that context, the layout engine 130 is configured to work with the machine translator 140 and the headless browser 142 to detect interface layout problems that can arise when adapting or tailoring the markup files 122 for use with different languages.

The machine translator 140 can be embodied as a machine translation, computer-directed translation, machine-aided human translation, interactive translation, or related translation service capable of translating words, phrases, and sentences from one language to another. Thus, the machine translator 140 can be configured to perform a substitution of words from one language to another. Beyond substitutions, the machine translator 140 can also translate words and phrases using linguistic rules, intermediary-level symbols and representations, inter-lingual machine translations, transfer-based machine translations, and other related methods. As described in further detail below, the layout engine 130 is configured to identify text in the markup files 122 and submit that text to the machine translator 140 for translation into one or more different languages for evaluation.

The headless browser 142 can be embodied as an application or service capable of evaluating the markup files 122 and rendering the interfaces defined by the markup files 122. In that context, the headless browser 142 can provide an environment similar to the client application 162 (e.g., a web browser), but directed by the layout engine 130 through a command line or API interface. Thus, the headless browser 142 can interpret and render XML, HTML, and other markup language files in the same or similar way that the client application 162 would, including styling elements such as page layout, color, font selection and execution of JavaScript and AJAX, for example. The headless browser 142 can also generate and capture screenshots of the interfaces defined by the markup files 122. In turn, the layout engine 130 can process those screenshots using optical character recognition (OCR) techniques, for example, to search for layout interference problems.

The layout engine 130 includes the parser 132, the preprocessor 134, the position evaluator 136, and the report generator 138. The parser 132 is configured to parse through the markup files 122 to identify text nodes in the markup files 122. To that end, the parser 132 can parse through the DOM tree structure of the markup files 122. In the context of the DOM tree of any given markup file 122, text nodes do not have any descendant or child nodes. Instead, text nodes include only text content (e.g., plaintext characters and/or strings in some language) without any HTML, XML, or other markup tags beside certain inline markup tags or elements. The content of a text node includes its data (or node value) property, such as the plaintext characters or strings the node encapsulates. Because text nodes do not have any descendant nodes, text nodes do not trigger events and appear as element nodes in the DOM tree structure.

Figure 2A:
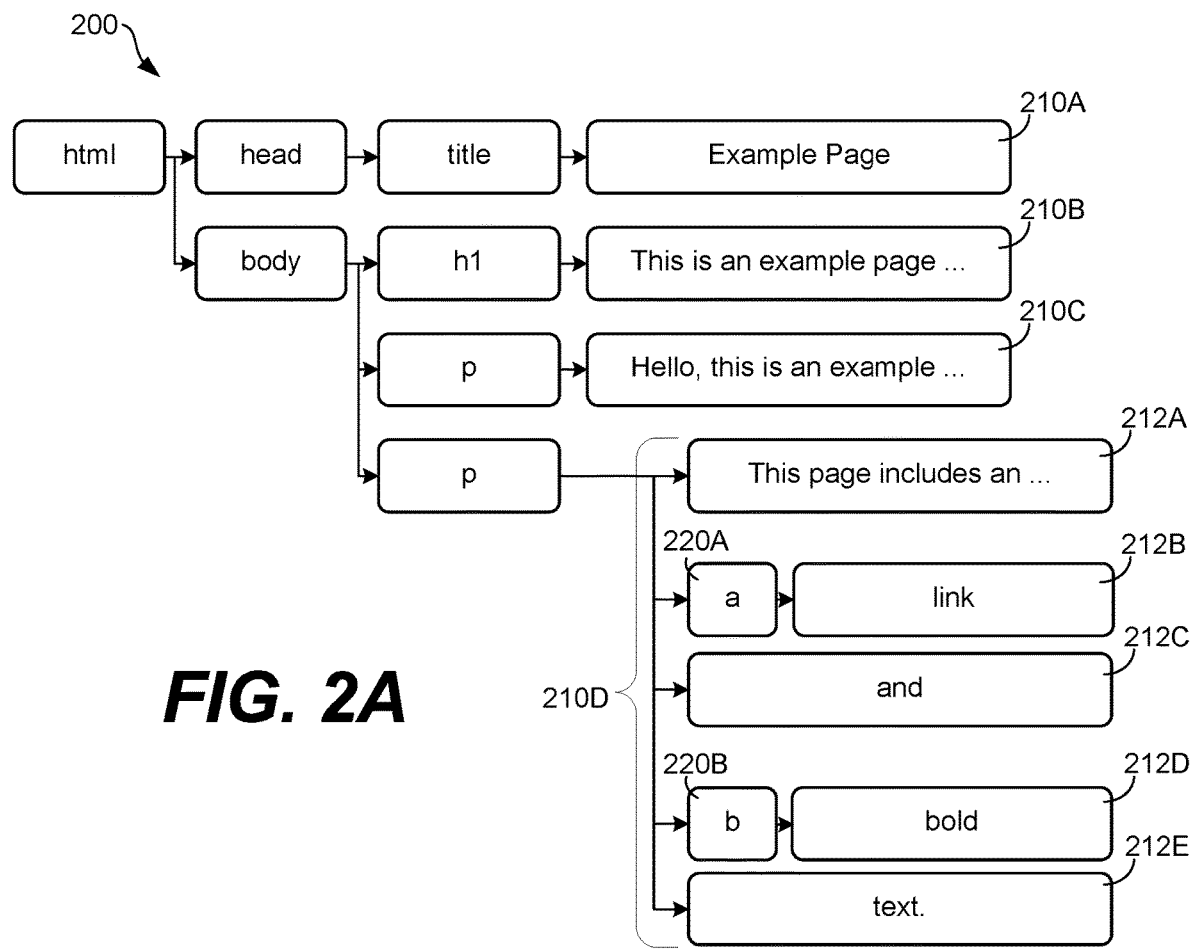
FIG. 2A illustrates an example of a document object model tree structure of an example markup file according to various examples described herein.

As a more particular example, FIG. 2A illustrates a DOM tree structure 200 of the example HTML listing in TABLE 1 below, which may be included in one of the markup files 122:

TABLE 1

```
<!doctype html>
<html>
    <head>
        <title>Example Page</title>
    </head>
    <body>
        <h1>This is an example page including text
nodes.</h1>
        <p>Hello, this is an example page including a
number of text nodes.</p>
        <p>This page includes an inline
            <a href="http://examplelink.net">link</a>
and
            <b>bold</b> text.</p>
    </body>
</html>
```

The parser 132 can parse or search through the DOM tree structure 200 of the example HTML listing shown in TABLE 1 to identify text nodes. With reference to FIG. 2A, the parser 132 can identify the text nodes 210A-210D in the example HTML listing. The text nodes 210A-210D are shown at the far right in the DOM tree structure 200 and do not have any descendant or child nodes. The text nodes 210A-210D include only text content without HTML, XML, or other markup tags beside certain inline markup tags.

As suggested above, the parser 132 is also configured to search through the DOM tree structure 200 to identify certain markup tags or elements that might occur within text nodes. For example, the parser 132 can identify various inline markup tags or elements, such as link (<a>), bold (<b>), italic (<i>), strong (<strong>), and other inline markup tags. In browsers, paragraph (<p>) and heading (<h1>) elements, among others, are generally rendered by browsers to take up the whole width and separate lines of a rendered page. Thus, paragraph (<p>) and heading (<h1>) elements are often called block elements. On the other hand, inline markup tags or elements such as link (<a>), bold (<b>), italic (<i>), strong (<strong>), and others are rendered on the same line with their surrounding text and are called inline elements. In the example shown in FIG. 2A, the parser 132 can identify the inline markup tags or elements 220A and 220B by searching or parsing through the DOM tree structure 200. The parser 132 can also delineate certain text nodes as having text sub-units based on the identification of inline markup tags or elements. For example, the parser 132 can delineate the text sub-units 212A-212E within the text node 210D based on the inline markup tags or elements 220A and 220B within the text node 210D. In various examples described in further detail below, the text sub-units 212A-212E are identified within the text node 210D to assist with the machine translation of text nodes that include inline markup tags or elements.

As noted above, a markup file 122 can define the layout of an interface to be rendered by the client application 162 on the client device 160. The interface can include a combination of static and dynamic interface elements, and the overall layout of the interface can be defined in part by the positions of the text nodes and/or user interface elements associated with the text nodes according to the markup file 122. To detect various types of layout interference problems that can arise when adapting the markup file 122 for use with different languages, the position evaluator 136 is configured to perform either a pseudo translation process, a machine translation process, or a combination of both the pseudo translation process and the machine translation process. When adapting or tailoring any given markup file 122 for use with different languages, both the pseudo and machine translation processes focus on the text nodes identified by the parser 132, because the translation of the text in those text nodes into different languages can lead to relatively large variations in the layout of the interface defined by the markup file 122.

The pseudo translation process is designed to estimate the types of variations that can occur in the layout of an interface without directly translating any text in text nodes into different languages (e.g., by artificially expanding the size of text nodes by inserting pseudo strings as described below). The machine translation process, on the other hand, is designed to estimate the variations that can occur by directly translating the text in text nodes into different languages using the machine translator 140. In either case, the position evaluator 136 can identify and/or evaluate whether text nodes or interface elements associated with those text nodes are likely to interfere with each other using pixel-based data obtained from scripting languages, for example, or by rendering the interfaces using the headless browser 142. Thus, the position evaluator 136 can evaluate the likelihood that layout interference problems might occur when tailoring a markup file 122 for use with different languages through several different processes and/or combinations of processes.

Before the position evaluator 136 searches for layout interference problems, the pre-processor 134 is configured to pre-process one or more text nodes for evaluation. As described below, the actions taken by the pre-processor 134 are relied upon to identify the positions and/or sizes of text nodes, to artificially vary the sizes of text nodes, and to insert characters for optical character recognition of text nodes. To help identify the positions and/or sizes of text nodes, the pre-processor 134 is configured to uniquely identify individual text nodes (or a number of text nodes) by associating them with the <span> tag. The pre-processor 134 can also assign a unique identifier to each <span> tag. For example, the pre-processor 134 can modify the text node 210C associated with the first paragraph of the HTML, listing in TABLE 1 to include the <span> tag with a unique identifier of "1". In that case, the pre-processor 134 can modify the first paragraph of the HTML listing in TABLE 1 to list "<p><span id="1"> Hello, this is an example page including a number of text nodes.</span></p>". As another example, the pre-processor 134 can modify the text node 210D, including the text sub-units 212A-212E, to list "<p><span id="2"> This page includes an inline <a href="http://examplelink.net">link</a> and <b>bold</b> text.</span></p>". Thus, the pre-processor 134 can associate one or more text nodes, text sub-units in text nodes, and/or other elements in a markup file 122 with a unique identifier using the <span> tag or other tags.

As another type of pre-processing, the pre-processor 134 can insert or append a pseudo string of characters into one or more text nodes or text sub-units in a markup file 122. The pseudo string of characters can be inserted into a text node, for example, as a way to artificially increase the size of the nodes (and the interface elements associated with them) in the layout of an interface defined by the markup file 122. For example, the pre-processor 134 can modify the text node 210C from the HTML listing in TABLE 1 to include a string of "#" characters before and after the text in the text node 210, to list "<p>#####Hello, this is an example page including a number of text nodes.#####</p>". In various cases, the pseudo string of characters can be inserted before, after, or before and after the text in a text node or text sub-unit.

By inserting the pseudo string, the pre-processor 134 can mimic the change (e.g., increase) in height and/or length that might occur if the text in a text node were translated to a different language. The pseudo string of characters can vary in character height, length, and/or type depending upon various factors, such as the average size (e.g., height and width) of characters in the target translation language, the average length of words in the target translation language, number of different target languages expected for deployment, and the granularity for which to detect layout interference problems. In one case, the pseudo string of characters is selected to increase the length of any given text node by about 20%-80%, but other ranges are within the scope of the concepts described. The pseudo string can also be selected to increase the height of any given text node by about 20%-80%, but other ranges can be used. The pseudo string can be formed from any American Standard Code for Information Interchange (ASCII), Unicode, or other suitable characters. In some cases, rather than inserting a pseudo string of characters, the pre-processor 134 can truncate or shorten the length of text in a text node.

The pre-processor 134 is also configured to submit the text from text nodes and/or text sub-units for machine translation by the machine translator 140. For example, the pre-processor 134 can submit the text from the text node 210C (e.g., "This is an example page including text nodes") to the machine translator 140. In response, the pre-processor 134 can receive translated text (e.g., "Esta es una página de ejemplo, incluyendo los nodos de texto") from the machine translator 140. The pre-processor 134 can then replace the original text in the text node 210C with the translated text from the machine translator 140 for further evaluation by the position evaluator 136.

If the text from a text node includes inline markup tags or elements, the machine translator 140 might produce translation errors. The machine translator 140 might produce disrupted, improperly-placed, missing, or split inline tags within translated text. Thus, to assist with the translation of text nodes including inline markup tags, the parser 132 can delineate text sub-units among text nodes based on the inline markup tags in text nodes. Once delineated, the pre-processor 134 can separately submit both the text from the text node 210D, for example, and the text from the text sub-nodes 212A-212E to the machine translator 140. In response, the pre-processor 134 can receive translated text for the text node 210D and translated text for the text sub-nodes 212A-212E from the machine translator 140.

The pre-processor 134 can then search through the translated text of the text node 210D to identify the positions of the translated text of the text sub-nodes 212A-212E in the translated text of the text node 210D. An approximate string matching or fuzzy string matching search algorithm can be used in this context. The fuzzy string matching algorithm can include calculating the distance between words in the translated text nodes and words in the translated sub-units to narrow down the matches. The approximate search algorithm can return the start position of a match between words in the translated text nodes and individual words in the translated sub-units, along with a length of the match. Thus, the approximate search algorithm can include calculating edit distances between n-grams in the translated text nodes and the translated sub-units, where an n-gram is a contiguous sequence of n items (e.g., characters or words) from a sequence of text. In other cases, the search algorithm can seek to match individual characters or sequences of characters of any length. Once the positions of the translated sub-nodes 212A-212E are identified using the search algorithm, the pre-processor 134 can re-insert the inline markup tags (e.g., the <a> and <b> tags shown in FIG. 2A) from the original text node 210D among the translated sub-nodes 212A-212E in the translated text node 210D.

The pre-processor 134 can also insert one or more pseudo characters into the text of a translated text node. The pseudo characters can include one or more unique characters that can be identified by the position evaluator 136 using OCR techniques in connection with screenshots captured by the headless browser 142. As examples, the pseudo characters can include a pair of #, $, or + characters, and the pre-processor 134 can replace the first and last characters of a translated character string with the pseudo characters (e.g., "#sta es una página de ejemplo, incluyendo los nodos de text#"). In experiments, the + character was found to be particularly suitable for having relatively high identification accuracy using OCR techniques, although other characters can be relied upon.

The pre-processor 134 can conduct a combination of any of the pre-processing tasks described above for any given markup file 122. To the extent necessary, the pre-processor 134 can store several versions of the markup files 122 in the data store 120 for processing by the position evaluator 136. For example, the pre-processor 134 can store multiple versions of one markup file 122 to account for different pseudo character string heights and lengths, machine language translations, and pre-processing variations to be evaluated for layout interference problems by the position evaluator 136.

The position evaluator 136 is configured to identify problems (or the likelihood for problems) in the layout of interfaces defined by the markup language in the markup files 122. To that end, the position evaluator 136 can identify the positions of text nodes, text sub-nodes, and/or interface elements associated with the text nodes and sub-nodes, as they are defined in the markup files 122. The position evaluator 136 can also identify the sizes of the text nodes, text sub-nodes, and associated interface elements. Once the positions and sizes of the elements are identified, the position evaluator 136 can determine whether or not those elements will interfere with (e.g., overlap with) each other when rendered for display.

Among other ways, the position evaluator 136 can identify and evaluate the positions of text nodes, text sub-units, and associated interface elements using script library tools and related methods. In some cases, the position evaluator 136 can rely upon the unique identifiers assigned to elements using the <span> tag, for example, to specify which element is being evaluated. In JavaScript, for example, the position of an element in pixels can be accessed using the offsetWidth and offsetHeight properties. Additionally, the size of the space inside an element, in pixels, can be accessed using the clientWidth and clientHeight properties. Thus, the position evaluator 136 can identify the position and amount of space that any text node, text sub-unit, or associated interface element takes up in terms of display pixels. In that context, a pixel is the basic unit of measurement in a browser and typically corresponds to the smallest dot on a display screen. The concepts are not limited to the use of evaluations based on the relative or absolute coordinates of pixels, however, as the position evaluator 136 can operate similarly using other metrics.

As another example, the position evaluator 136 can identify and evaluate the positions of text nodes, text sub-units, and associated interface elements using the jQuery manipulation library. The jQuery library can be used as a DOM manipulation library for finding, selecting, and manipulating DOM elements in one or more of the markup files 122. For example, jQuery can be used for finding the position of the elements in a markup file 122 having a certain property (e.g., all elements with an <h1> tag), changing the attributes (e.g., color, visibility) of certain elements, or making certain elements respond to an event. The position evaluator 136 can use the jQuery .position( ) method to identify the current position in pixels of an element relative to its parent element. Additionally or alternatively, the position evaluator 136 can use the jQuery .offset( ) method to identify the current position in pixels relative to the document.

Figure 2B:
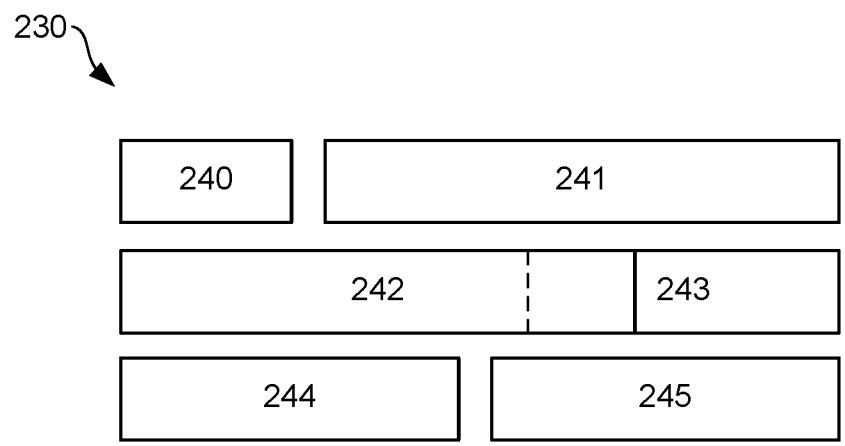
FIG. 2B illustrates an example display space including a number of interface elements, two of which overlap with each other, according to various examples described herein.

Once the position evaluator 136 has identified the positions (e.g., corner pixel locations, heights, widths, etc.) of the interface elements defined in a markup file 122, the position evaluator 136 can determine whether or not those elements interfere with (e.g., overlap with) each other. For context, FIG. 2B illustrates an example display space 230 including a number of interface elements 240-245 drawn in the positions identified by the position evaluator 136 using script library tools. The interface elements 240-245 can include any type of input elements, navigation elements, and/or informational elements, among other type of interface elements.

Consistent with the examples described herein, the sizes of the interface elements 240-245 shown in FIG. 2B can be defined based in part on the height and length of the text in the text nodes defined in a markup file 122 for the interface elements 240-245. To identify the types of problems that might arise when the markup file 122 is adapted for use with different languages, the pre-processor 134 pre-processes the text nodes for the interface elements 240-245 to include one or more pseudo character strings, machine translated text, pseudo character pairs, etc. Thus, the interface elements 240-245 have been adapted in size to account for the types of changes that might be attributed to the use of different languages in the markup file 122.

The position evaluator 136 can determine whether or not any of the interface elements 240-245 touch or overlap each other in the pixel display space 230 with reference to the corner pixel locations, heights, and widths of the interface elements 240-245. As shown in FIG. 2B, the position evaluator 136 can determine a layout interference problem between the interface elements 242 and 243 because they overlap with each other. Thus, the position evaluator 136 can also provide an indication (and the relevant details) of the layout interference problem shown in FIG. 2B to the report generator 138.

Additionally, the position evaluator 136 can identify and evaluate the positions of text nodes, text sub-units, and associated user interface elements by rendering a markup file 122 using the headless browser 142. As described above, the headless browser 142 can interpret and render markup files 122 in the same or similar way that the client application 162 would. The headless browser 142 can also generate and capture screenshots of the interfaces defined by the markup files 122. In turn, the layout engine 130 can process those screenshots using OCR techniques, for example, to search for layout interference problems.

Figure 2C:
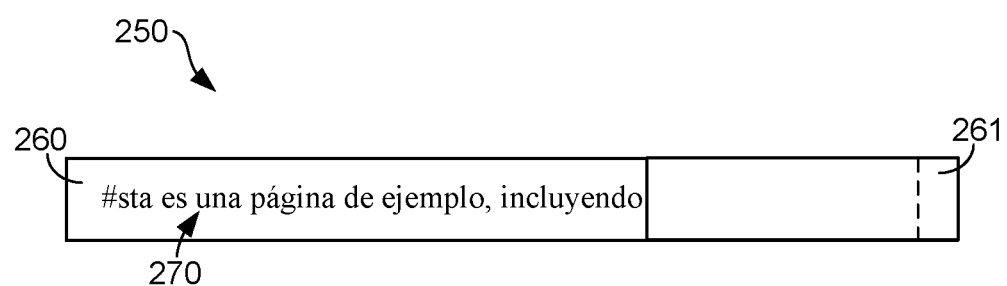
FIG. 2C illustrates an example screenshot of a display space including a pair of overlapping interface elements according to various examples described herein.

FIG. 2C illustrates an example screenshot of a display space 250 generated by the headless browser 142. As shown, the display space 250 includes a pair of interface elements 260 and 261. In this example, the pre-processor 134 translated and modified the text string 270 of the text node associated with the interface element 260 to include the pseudo characters # at the front and back ends of the text string 270. Thus, the position evaluator 136 can determine that the interface element 260 is overlapped in part by another interface element (i.e., the interface element 261) because only the front pseudo character # in the text string 270 can be detected using OCR techniques. The end pseudo character # in the text string 270 is obscured in this case by the interface element 261. Again, the position evaluator 136 can provide an indication (and the relevant details) of the layout interference problem shown in FIG. 2C to the report generator 138.

The report generator 138 is configured to maintain and update a list of interface layout problems or issues (or the potential for such problems to arise) as they are identified and evaluated by the position evaluator 136. The report generator 138 can also generate the layout reports 124 to highlight any interface layout problems that might arise when the markup files 122 are adapted for use with different languages. The layout reports 124 can be used by developers to reduce the amount of development time spent on trouble-shooting interface layouts for use with different languages.

Figure 3A:
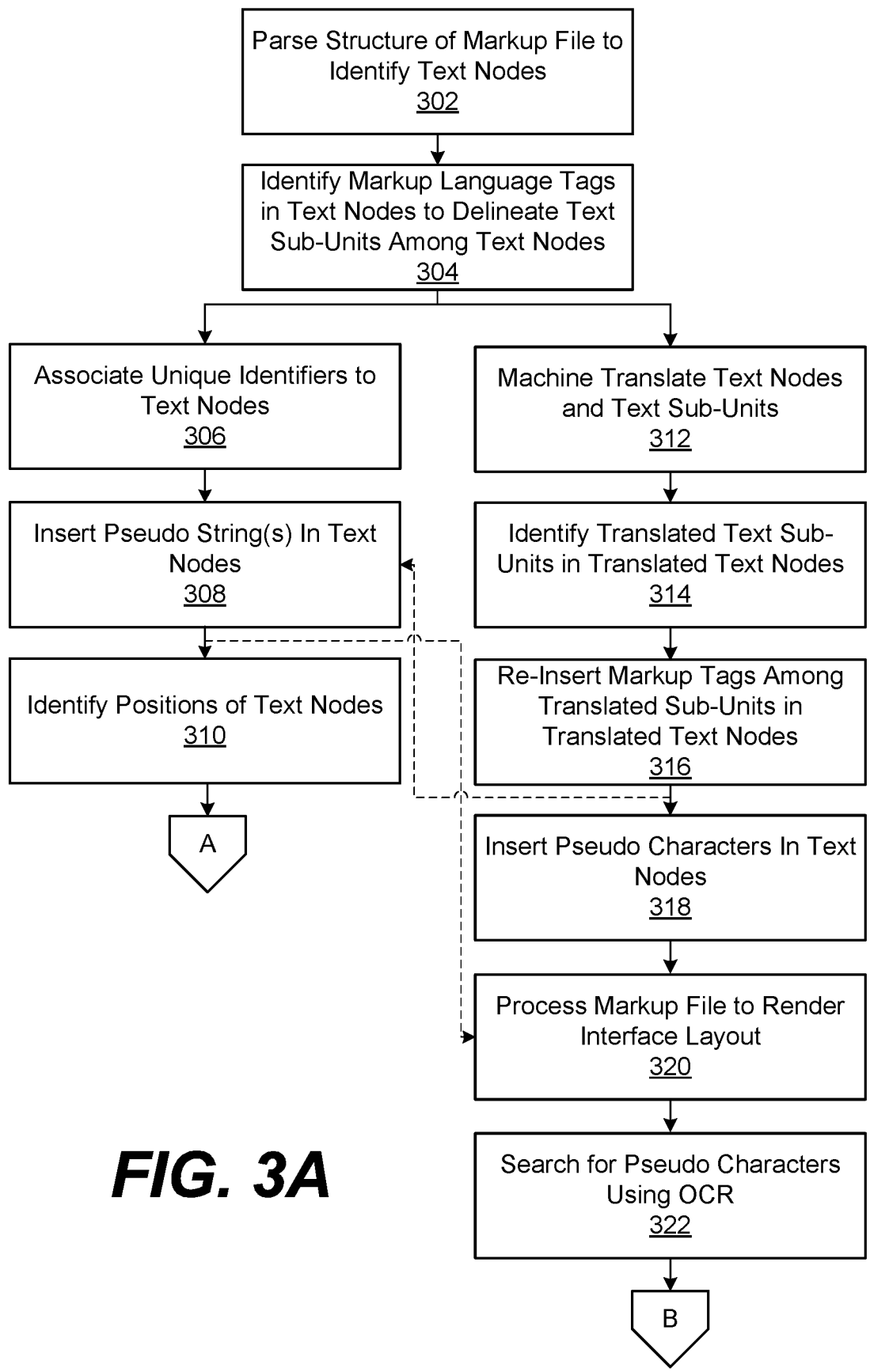
FIGS. 3A-3C illustrate a process for interface layout interference detection according to various examples described herein.
Figure 3B:
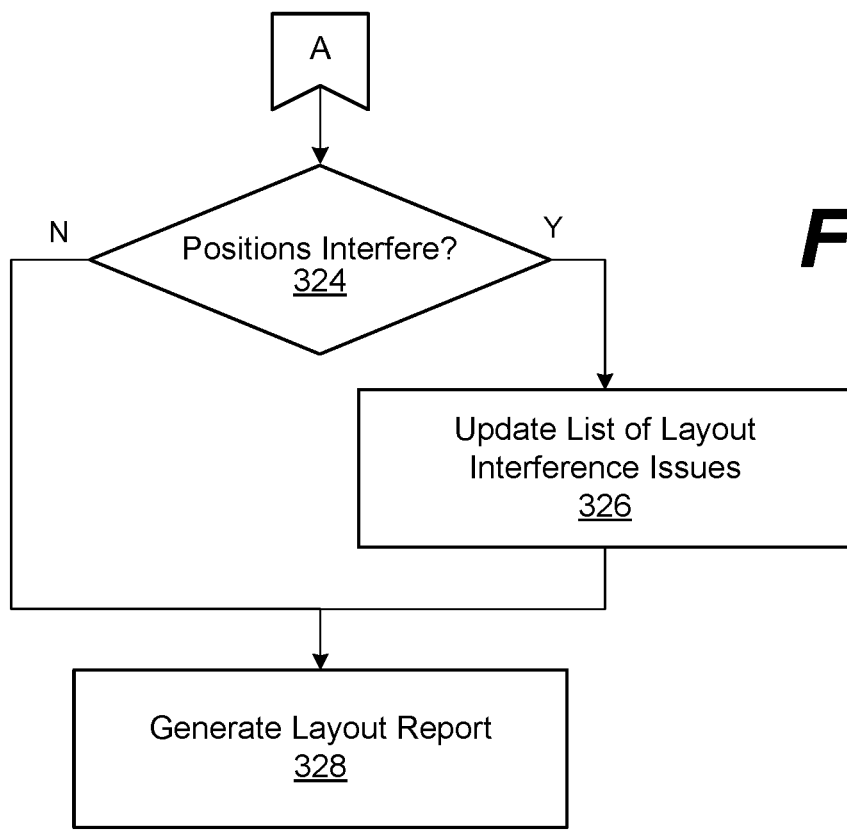
Figure 3C:
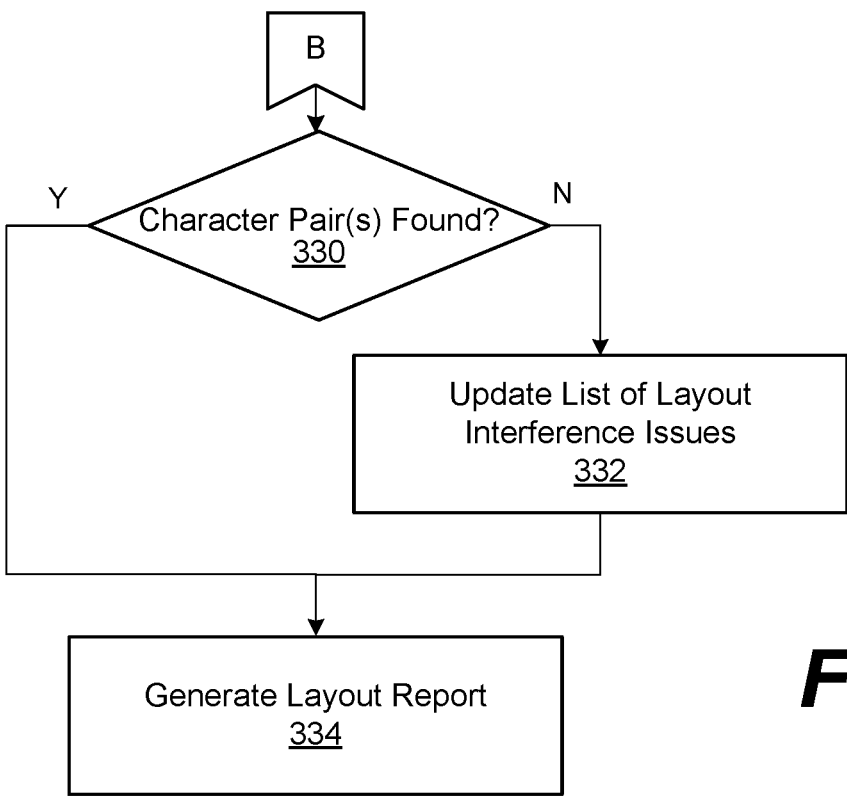

FIGS. 3A-3C illustrate a process for interface layout interference detection according to various examples described herein. The process illustrated in FIGS. 3A-3B is described in connection with the computing environment 100 shown in FIG. 1, although other computing environments could perform the process. Although the flowcharts show an order of execution, the order of execution can differ from that which is shown. For example, the order of execution of two or more elements can be switched relative to the order shown or as described below. Also, two or more elements shown in succession can be executed concurrently or with partial concurrence. Further, in some examples, one or more of the elements shown in the flowcharts can be skipped or omitted as described below.

At step 302, the process can include the parser 132 parsing through one or more of the markup files 122 to identify text nodes in the markup files 122. The parser 132 can parse through the DOM tree structure of the markup files 122. In the DOM tree of a markup file 122, text nodes do not have any descendant or child nodes. The content of a text node includes its data (or node value) property, such as the plaintext characters or strings the node encapsulates. As a more particular example, the parser 132 can parse through the DOM tree structure of the HTML listing shown in TABLE 1 to identify the text nodes 210A-210D.

At step 304, the process can include the parser 132 identifying any inline markup tags, such as link (<a>), bold (<b>), italic (<i>), strong (<strong>), or other inline tags, within text nodes. In the example shown in FIG. 2A, the parser 132 can identify the inline markup tags or elements 220A and 220B by searching or parsing through the DOM tree structure 200. The parser 132 can also delineate the text sub-units 212A-212E within the text node 210D based on the inline markup tags or elements 220A and 220B within the text node 210D. The text sub-units 212A-212E are identified within the text node 210D to assist with the machine translation of text nodes that include inline markup tags or elements.

From step 304, the process can proceed to step 306, proceed to step 312, or proceed to process steps 306 and 312 (and those steps that follow thereafter) concurrently, with partial concurrence, or respectively in time. To organize the description, steps 306, 308, 310, and the steps shown in FIG. 3B are described before turning to steps 312, 314, 316, 318, 320, 322, and the steps shown in FIG. 3C. Additionally, as described below, the process can move between various steps, such as from step 308 to step 318 or to step 320, and/or from step 316 to step 310.

At step 306, the pre-processor 134 can include the pre-processor 134 associating unique identifiers with any of the text nodes or text sub-nodes identified at steps 302 and 304. The pre-processor 134 can assign those unique identifiers the text nodes using the <span> tag, and assigning each of the <span> tags with unique identifiers. As one example, the pre-processor 134 can modify the first paragraph of the HTML listing in TABLE 1 to list "<p><span id="1"> Hello, this is an example page including a number of text nodes.</span></p>". As another example, the pre-processor 134 can modify the text node 210D, including the text sub-units 212A-212E, to list "<p><span id="2"> This page includes an inline <a href="http://examplelink.net">link</a> and <b>bold</b> text.</span></p>".

At step 308, the process can include the pre-processor 134 inserting a pseudo string of characters into one or more of the text nodes or text sub-units identified at steps 302 and 304. The pseudo string of characters can be inserted into a text node, for example, as a way to artificially increase the size of the node (and the interface elements associated with them) in the layout of an interface. For example, the pre-processor 134 can modify the text node 210C from the HTML, listing in TABLE 1 to include a string of "#" characters before and after the text in the text node 210, to list "<p>#####Hello, this is an example page including a number of text nodes.#####</p>". The pseudo string of characters can be inserted before, after, or before and after the text in a text node or text sub-unit. The pseudo string of characters can vary in character height and length and/or type depending upon various factors described herein.

At step 310, the process can include the position evaluator 136 identifying the positions of text nodes, text sub-units, and associated interface elements in one or more of the markup files 122 using script library tools and related methods. The position evaluator 136 can identify the position of an element in pixels using the offsetWidth and offsetHeight properties. Additionally, the size of the space inside an interface element, in pixels, can be identified using the clientWidth and clientHeight properties. As another example, the position evaluator 136 can identify the positions of interface elements using the jQuery manipulation library. The position evaluator 136 can use the jQuery .position( ) method to identify the current position in pixels of an element relative to its parent element. Additionally, the position evaluator 136 can use the jQuery .offset( ) method to identify the current position in pixels relative to the document. Thus, at step 310, the position evaluator 136 can identify the position and amount of space that any text node, text sub-unit, or associated interface element takes up in terms of display pixels or another suitable metric.

At step 324 in FIG. 3B, the process can include the position evaluator 136 determining whether or not the positions of the interface elements identified at step 310 in FIG. 3A interfere with each other. For example, the position evaluator 136 can determine whether or not any of the interface elements 240-245 shown in FIG. 2B touch or overlap each other in the pixel display space 230 with reference to the corner pixel locations, heights, and widths of the interface elements 240-245 identified at step 310. If none of the interface elements 240-245 interfere with each other, the process can proceed to step 328. However, if the positions of the interface elements 242 and 243 in FIG. 2B interfere with each other, the position evaluator 136 can determine that the positions interfere with each other at step 324. Thus, the position evaluator 136 can provide an indication of the layout interference problem to the report generator 138.

At step 326, the process can include the report generator 138 updating a list of layout interference issues stored in the data store 120 based on the determinations made at step 324. Further, at step 328, the process can include the report generator 138 generating one or more layout reports 124 to highlight any interface layout problems identified by the position evaluator 136. The layout reports 124 can be used by developers to reduce the amount of development time spent on troubleshooting interface layouts for use with different languages. Thus, the layout reports 124 can be provided and presented to users of the computing environment 100 or the client device 160.

The actions taken at steps 306, 308, and 310 in FIG. 3A and at steps 324, 326, and 328 in FIG. 3B can be considered a type of pseudo translation process. The pseudo translation process is designed to anticipate layout interference problems that can occur in markup files 122 without the need to machine translate any text in the markup files 122 into different languages. The machine translation process, on the other hand, is designed to anticipate layout interference problems by machine translating text in the markup files 122 into different languages using the machine translator 140. The machine translation process occurs at steps 312, 314, 316, 318, 320, and 322 in FIG. 3A and at steps 330, 332, and 334 in FIG. 3C.

Referring back to FIG. 3A to cover the machine translation process, at step 312, the process can include the machine translator 140 machine translating the text in one or more of the text nodes or text sub-units identified at steps 302 and 304. The pre-processor 134 can submit the text from the text node 210C (e.g., "This is an example page including text nodes"), for example, to the machine translator 140. In response, the pre-processor 134 can receive translated text (e.g., "Esta es una página de ejemplo, incluyendo los nodos de texto") back from the machine translator 140. The pre-processor 134 can then replace the original text in the text node 210C in the markup file 122 with the translated text from the machine translator 140 for further evaluation by the position evaluator 136. If a text node includes inline markup tags or elements, the machine translator 140 might produce translation errors. Thus, as described above, the pre-processor 134 can separately submit both the text from the text node 210D, for example, and the text from the text sub-nodes 212A-212E to the machine translator 140. In that case, the pre-processor 134 can receive both translated text for the text node 210D and translated text for the text sub-nodes 212A-212E from the machine translator 140.

At step 314, the process can include the pre-processor 134 identifying the translated text of the text sub-nodes 212A-212E in the translated text node 210D. For example, the pre-processor 134 can search through the translated text of the text node 210D to identify the positions of the translated text of the text sub-nodes 212A-212E in the translated text of the text node 210D. An approximate string matching or fuzzy string matching search algorithm, as described above, can be used to calculate the distance between words in the translated text and translated sub-unit text strings to narrow down the matches.

At step 316, the process can include the pre-processor 134 re-inserting the inline markup tags (e.g., the <a> and <b> tags shown in FIG. 2A) from the original text node 210D among the translated sub-nodes 212A-212E in the translated text node. The actions taken at steps 314 and 316 can help to minimize the types of problems which can occur if a text node includes inline markup tags, in which case the machine translator 140 might produce disrupted, improperly-placed, missing, or split tags within translated text.

At step 318, the process can include the pre-processor 134 inserting one or more pseudo characters into the translated text nodes from steps 312 and/or 316 in one or more markup files 122. The pseudo characters can include one or more unique characters that can be identified by the position evaluator 136 using OCR techniques in step 322. As examples, the pseudo characters can include a pair of #, $, or + characters, and the pre-processor 134 can replace the first and last characters of a translated character string with the pseudo characters as described above.

At step 320, the process can include the position evaluator 136 processing one or more markup files 122 using the headless browser 142 to render the interface layouts defined in the markup files 122. The headless browser 142 can generate and capture one or more screenshots of the interfaces defined by markup files 122, and the position evaluator 136 can process those screenshots using OCR techniques, for example, to search for layout interference problems.

At step 322, the process can include the pre-processor 134 searching for pairs of pseudo characters in the screenshots rendered by the headless browser 142 at step 320. For example, FIG. 2C illustrates a display space 250 generated by the headless browser 142. The display space 250 includes a pair of interface elements 260 and 261. In this example, the pre-processor 134 has previously modified the text string 270 associated with the interface element 260 to include the pseudo characters # at the front and back ends. At step 322, the pre-processor 134 can search for the pair of pseudo characters # which are expected to be found in the text string 270.

At step 330 in FIG. 3C, the process can include the position evaluator 136 determining whether or not all the pairs of pseudo characters inserted by the pre-processor 134 into the markup files 122 which were rendered at step 320 and searched for at step 322 are present in the screenshots. If all the pairs of pseudo characters are present, the process can proceed to step 334. On the other hand, in the example shown in FIG. 2C, the position evaluator 136 can determine that the interface element 260 is overlapped in part by another interface element (i.e., the interface element 261) because only the front pseudo character # in the text string 270 was identified in the search using OCR techniques. The end pseudo character # in the text string 270 is obscured in this case by the interface element 261 and cannot be identified. Thus, the position evaluator 136 can provide an indication of the layout interference problem to the report generator 138.

At step 332, the process can include the report generator 138 updating a list of layout interference issues stored in the data store 120 based on the determinations made at step 330. Further, at step 334, the process can include the report generator 138 generating one or more layout reports 124 to highlight any interface layout problems identified by the position evaluator 136. The layout reports 124 can be used by developers to reduce the amount of development time spent on troubleshooting interface layouts for use with different languages. Thus, the layout reports 124 can be provided and presented to users of the computing environment 100 or the client device 160.

In some cases, the process shown in FIGS. 3A-3C can include a combination of the process steps for the pseudo translation process and the machine translation process. For example, the process can move back and forth between various steps in the pseudo and the machine translation processes, such as from step 308 to step 318 or to step 320, and/or from step 316 to step 310. Additionally, the process shown in FIGS. 3A-3C can be iterative and occur in an ongoing fashion over time or any number of the markup files 122.

The flowcharts in FIGS. 3A-3C show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 can include at least one processing circuit. Such a processing circuit can include, for example, one or more processors and one or more storage devices that are coupled to a local interface. The local interface can include, for example, a data bus with an accompanying address/control bus or any other suitable bus structure.

The storage devices for a processing circuit can store data or components that are executable by the processors of the processing circuit. For example, the layout engine 130, machine translator 140, headless browser 142, and/or other components can be stored in one or more storage devices and be executable by one or more processors in the computing environment 100. Also, a data store, such as the data store 120 can be stored in the one or more storage devices.

The layout engine 130, machine translator 140, headless browser 142, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the layout engine 130, machine translator 140, headless browser 142, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for interface layout interference detection, comprising:

parsing, by at least one computing device, a markup file to identify a plurality of text nodes and a plurality of inline markup tags in a text node among the plurality of text nodes in the markup file;

delineating, by the at least one computing device, a plurality of text sub-units in the text node based on the plurality of inline markup tags in the text node;

separately machine translating, by the at least one computing device, the plurality of text nodes and the plurality of text sub-units to determine a plurality of translated text nodes and a plurality of translated text sub-units;

inserting, by the at least one computing device, the plurality of inline markup tags among the plurality of translated text sub-units in a translated text node among the plurality of translated text nodes based on a string matching search algorithm that identifies positions of the plurality of translated text sub-units in the translated text node using character matching;

inserting, by the at least one computing device, a first inserted pseudo character at a front end of the translated text node and a second inserted pseudo character at a back end of the translated text node;

identifying, by the at least one computing device, a position of a first interface element associated with the translated text node in an interface layout defined by the markup file;

searching for the first inserted pseudo character and the second inserted pseudo character in the interface layout;

identifying at least one of the first inserted pseudo character or the second inserted pseudo character in the translated text node from the searching; and in response to identifying at least one of the first inserted pseudo character or the second inserted pseudo character in the translated text node, determining, by the at least one computing device, that the first interface element interferes with a second interface element in the interface layout based on an indication that at least one of the first inserted pseudo character or the second inserted pseudo character in the translated text node is obscured by an overlap with the second interface element from the searching.

2. The method according to claim 1, further comprising processing, by the at least one computing device, the markup file with the plurality of translated text nodes using a headless browser to render the interface layout defined by the markup file.

3. The method according to claim 2, wherein: searching for the first inserted pseudo character and the second inserted pseudo character in the interface layout comprises searching using optical character recognition.

4. The method according to claim 1, further comprising, before the machine translating, identifying, by the at least one computing device, the plurality of inline markup tags among the plurality of text nodes to delineate the plurality of text sub-units in the plurality of text nodes.

5. The method according to claim 4, wherein inserting the plurality of inline markup tags comprises calculating edit distances between n-grams in the translated text node and the plurality of translated text sub-units.

6. The method according to claim 5, further comprising, after the machine translating, identifying, by the at least one computing device, the plurality of translated text sub-units among the plurality of translated text nodes based on the string matching search algorithm.

7. The method according to claim 1, further comprising associating, by the at least one computing device, a unique identifier with the text node among the plurality of text nodes to determine at least one position coordinate associated with the text node in the interface layout.

8. The method according to claim 1, further comprising generating, by the at least one computing device, a layout report that identifies interference between the first interface element and the second interface element in the interface layout.

9. A non-transitory computer-readable medium embodying program code executable in at least one computing device that, when executed by the at least one computing device, directs the at least one computing device to at least:
parse a file to identify a plurality of text nodes and a plurality of inline markup tags in a text node among the plurality of text nodes in the file;
delineate a plurality of text sub-units in the text node based on the plurality of inline markup tags in the text node;
separately machine translate the plurality of text nodes and the plurality of text sub-units to determine a plurality of translated text nodes and a plurality of translated text sub-units;
insert the plurality of inline markup tags among the plurality of translated text sub-units in a translated text node among the plurality of translated text nodes based on a string matching search algorithm that identifies positions of the plurality of translated text sub-units in the translated text node using character matching;
insert a first inserted pseudo character at a front end of the translated text node among the plurality of text translated nodes and a second inserted pseudo character at a back end of the translated text node;
search for the first inserted pseudo character and the second inserted pseudo character in an interface layout defined by the file;
identify at least one of the first inserted pseudo character or the second inserted pseudo character in the translated text node from the searching; and in response to identifying at least one of the first inserted pseudo character or the second inserted pseudo character in the translated text node, determine that a first interface element in the interface layout interferes with a second interface element in the interface layout based on an indication that at least one of the first inserted pseudo character or the second inserted pseudo character in the translated text node is obscured by an overlap with the second interface element from the search.

10. The non-transitory computer-readable medium according to claim 9, wherein the at least one computing device is further directed to at least generate a layout report that identifies interference between the first interface element and the second interface element in the interface layout.

11. The non-transitory computer-readable medium according to claim 9, wherein the at least one computing device is further directed to at least:
process the file using a headless browser to render the interface layout defined by the file; and
search for the first pseudo inserted character and the second inserted pseudo character in the interface layout using optical character recognition.

12. The non-transitory computer-readable medium according to claim 9, wherein the at least one computing device is further directed to at least:
calculate edit distances between n-grams in the translated text node and the plurality of translated text sub-units.

13. The non-transitory computer-readable medium according to claim 12, wherein the at least one computing device is further directed to at least:
identify the plurality of translated text sub-units among the plurality of translated text nodes based on the string matching search algorithm.

14. The non-transitory computer-readable medium according to claim 9, wherein the at least one computing device is further directed to at least:
search for the first inserted pseudo character and the second inserted pseudo character in the interface layout using optical character recognition.

15. A system comprising:
a processing device; and
a memory coupled to the processing device the memory storing instructions which, when executed by the processing device, cause the system to:
parse a file to identify a plurality of text nodes and a plurality of inline markup tags in a text node among the plurality of text nodes in the file;
delineate a plurality of text sub-units in the text node based on the plurality of inline markup tags in the text node;
separately translate the plurality of text nodes and the plurality of text sub-units to determine a plurality of translated text nodes and a plurality of translated text sub-units;
insert the plurality of inline markup tags among the plurality of translated text sub-units based on a string matching search algorithm that identifies positions of the plurality of translated text sub-units in a translated text node using character matching;
insert a first inserted pseudo character at a front end of the translated text node among the plurality of translated text nodes and a second inserted pseudo character at a back end of the translated text node;
process the file using a headless browser to render an interface layout defined by the file;

search for the first inserted pseudo character and the second inserted pseudo character in the interface layout;

identify at least one of the first inserted pseudo character or the second inserted pseudo character in the translated text node from the searching; and in response to identifying at least one of the first inserted pseudo character or the second inserted pseudo character in the translated text node, determine that a first interface element associated with the translated text node interferes with a second interface element in the interface layout based on an indication that at least one of the first inserted pseudo character or the second inserted pseudo character is obscured by an overlap with the second interface element from the search.

16. The system according to claim 15, wherein, to insert the plurality of inline markup tags, the processing device is further configured to:

calculate edit distances between n-grams in the translated text node and the plurality of translated text sub-units.

17. The system according to claim 15, wherein the processing device is further configured to associate a unique identifier with the text node among the plurality of text nodes to determine at least one position coordinate associated with the text node in the interface layout.

18. The system according to claim 15, wherein the processing device is further configured to generate a layout report that identifies interference between the first interface element and the second interface element in the interface layout.

19. The method according to claim 1, wherein inserting the plurality of inline markup tags comprises calculating a distance between words in the translated text node and words in a translated text sub-unit to return a start position of a match between words in the translated text node and the translated text sub-unit.

20. The non-transitory computer-readable medium according to claim 9, wherein the at least one computing device is further directed to at least associate a unique identifier with a text node among the plurality of text nodes to determine at least one position coordinate associated with the text node in the interface layout.

* * * * *